UNITED STATES PATENT OFFICE.

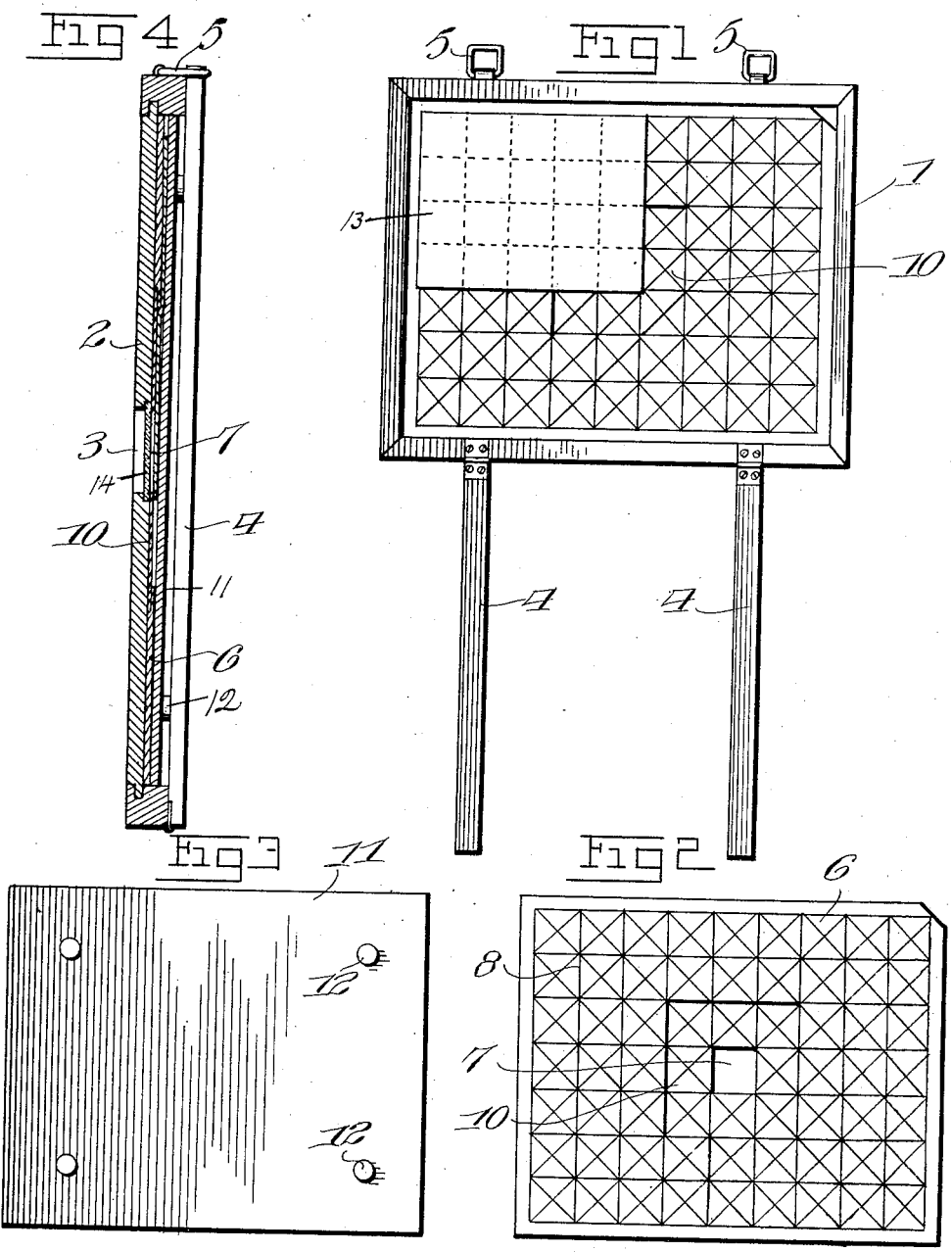

GEORGE FROENDT, OF MILFORD, IOWA.

PRINTING-FRAME.

1,072,444.  Specification of Letters Patent.  Patented Sept. 9, 1913.

Application filed May 18, 1912. Serial No. 698,242.

*To all whom it may concern:*

Be it known that I, GEORGE FROENDT, a citizen of the United States, residing at Milford, in the county of Dickinson and State of Iowa, have invented new and useful Improvements in Printing-Frames, of which the following is a specification.

This invention relates to printing frames and the object of the invention is to provide a simple and efficient device of this character whereby stamp pictures may be printed on a large sheet of paper and so that the entire lot may be developed at one operation by immersing the single sheet into the developing fluid.

Further objects of this invention will appear as the following specific description is read in connection with the accompanying drawing, which forms a part of this application, and in which:—

Figure 1 is a rear elevation with the clamping arms in open position and with the back removed. Fig. 2 is an elevation of the back removed from the frame. Fig. 3 is an elevation of the frame plate. Fig. 4 is a section taken through the assembled device showing the plate and printing paper therein.

Referring more particularly to the drawing, 1 represents a substantially rectangular frame which is provided with a plate support 2 having a central opening 3 therein. Pivoted to one side of the frame are clamping arms 4 which when bridged across the frame, as will be hereinafter described, are adapted to be engaged and held in clamping position by pivot loops 5. Used in connection with the frame is a graduated frame sheet 6 which is provided with a central opening 7 adapted to register with the opening 3 and is marked on the back with a plurality of lines both longitudinally of the sheet and transversely of the sheet, as shown at 8, so that the printing sheet 13 may be properly alined and properly moved so that new spaces on the printing sheet will be developed at each operation and in the proper place upon the printing sheet 13. This frame sheet is preferably constructed of relatively stiff material, such as pasteboard, or the like, the center portion of which is cut out and filled in with a thin sheet of paper, as shown at 10 so that the printing sheet 13 may be brought into close engagement with the negative or photographic plate 14. The back member is shown at 11 and is provided with a plurality of resilient projections 12 arranged thereon and adapted to be engaged by the clamping arms 4.

In practice, the photographic plate 14 is placed upon the plate support 2 in proper position over the opening 3 and the frame sheet is then placed in the frame 1 so that the opening 7 therein registers with the opening 3 in the base board. The printing sheet 13 is then placed upon the top of the frame sheet with one corner thereof covering the opening in the frame sheet. The back member 11 is then placed upon the printing sheet and clamped in position by the clamping arms 4. After the picture has been printed, the back plate is removed and the printing sheet moved longitudinally or transversely of the frame sheet a distance equal to the width of the opening when the operation is then repeated. The movement of the printing sheet may be correctly regulated by the graduations on the frame sheet. By moving the printing sheet transversely and longitudinally, as just described, a plurality of pictures of the size of the opening may be printed upon a single sheet and developed at one operation. If each exposure is made in the same length of time, all the pictures will be of the same color or shade.

What is claimed is:—

A device of the class described comprising a rectangular frame, a plate supporting member carried therein and having a relatively small central aperture, a sheet arranged upon the supporting member and having a thin center with an aperture therein to coincide and register with the aperture in the supporting sheet, said sheet having graduations of a size corresponding with the aperture in the sheet, a back plate, and means to clamp the back plate on said sheet.

In testimony whereof I affix my signature in presence of two witnesses.

GEORGE FROENDT.

Witnesses:
W. R. KENDALL,
G. A. WELLS.

Copies of this patent may be obtained for five cents each, by addressing the "Commissioner of Patents, Washington, D. C."